J. P. Ware.
Corn Planter.
Nº 88,244. Patented Mar. 23, 1869.

Witnesses;
Cornelius Coo
Leopold Euert,

Inventor;
John P. Ware
per
Alexander & Graham
Atty's,

JOHN P. WARE, OF MONTGOMERY CITY, MISSOURI.

*Letters Patent No. 88,244, dated March 23, 1869.*

IMPROVEMENT IN CORN-PLANTERS.

The Schedule referred to in these Letters Patent and making part of the same.

*To all whom it may concern:*

Be it known that I, JOHN P. WARE, of Montgomery City, in the county of Montgomery, and in the State of Missouri, have invented certain new and useful Improvements in "Corn-Planters;" and do hereby declare that the following is a full, clear, and exact description thereof, reference being had to the accompanying drawings, and to the letters of reference marked thereon.

The nature of my invention consists in the construction and general arrangement of a "corn-planter," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1:
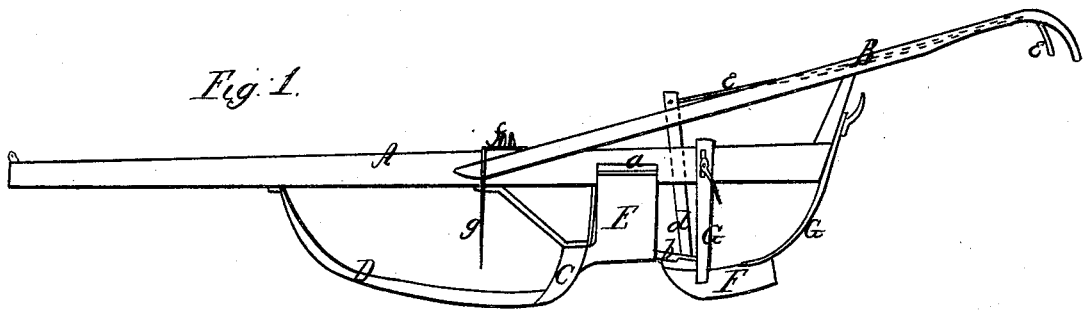

Figure 1 is a side view, and

Figure 2:
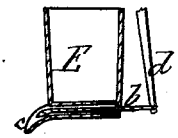

Figure 2, a side view, in section, of the corn-box.

A represents the plow-beam, to which the handles B B are secured in any of the known and usual ways.

C is the plow, which makes the furrow for the corn, and is secured, in some suitable manner, to the under side of the beam A.

From the lower front edge of the plow C, a curved sword, or cutter, D, extends forward to a suitable point on the beam A, said sword cutting the earth for the plow, and preventing hanging.

The corn-box E is situated in rear of the plow C, and secured to the beam A, projecting on one side of said beam, this portion of the corn-box being covered with a lid, *a*, as seen in fig. 1.

The bottom of the corn-box E is provided with a suitable opening for the corn to drop through on to the charger *b*, which carries it out through the spout *c*, just in rear of the plow C.

The charger *b* is operated by means of a lever, *d*, to the lower end of which it is pivoted.

The lever *d* is itself pivoted to the side of the beam A, and, from the upper end of said lever, a rod, *e*, extends along one of the handles B, so that, when the operator has hold of the handles, he will also grasp the rod *e*. The end of said rod being bent in suitable shape, a slight pressure on the same will move the lever *d*, and thus operate the charger.

A spring, attached to one of the handles, bears on the upper end of the lever *d*, and brings the charger *b* back again, in position for the next discharge.

The shovel F, which covers the furrow, is curved, so as to make a rolling ridge on the corn. It is attached to the beam A by means of two slotted bars, G, fastened by bolt and set-screw, so that the shovel, or shoe F can be raised or lowered at will, thus covering the corn either deep or shallow.

From a suitable point, on top of the point A, is placed an adjustable bar, *f*, from the outer end of which is suspended an arm, *g*, which serves as a gauge for the width of the rows.

Having thus fully described my invention,

What I claim as new, and desire to secure by Letters Patent, is—

The arrangement of the beam A, plow C, cutter D, seed-box E, and adjustable shovel, or shoe F, all constructed as described, and operating substantially as and for the purposes herein set forth.

In testimony that I claim the foregoing, I have hereunto set my hand, this 7th day of November, 1868.

JOHN P. WARE.

Witnesses:
FRANK SABEIN,
PARK HENSHAW.